United States Patent
Lee et al.

(10) Patent No.: US 12,198,458 B2
(45) Date of Patent: Jan. 14, 2025

(54) CHARACTER RECOGNITION METHOD FOR DYNAMIC IMAGES

(71) Applicant: Quanta Computer Inc., Taoyuan (TW)

(72) Inventors: Chen-Chung Lee, Taoyuan (TW); Chia-Hung Lin, Taoyuan (TW); Chun-Hung Chen, Taoyuan (TW); Chien-Kuo Hung, Taoyuan (TW); Wen-Kuang Chen, Taoyuan (TW); En-Chi Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 337 days.

(21) Appl. No.: 18/045,855

(22) Filed: Oct. 12, 2022

(65) Prior Publication Data
US 2024/0020998 A1   Jan. 18, 2024

(30) Foreign Application Priority Data

Jul. 13, 2022 (TW) .................................. 111126250

(51) Int. Cl.
*G06V 30/19* (2022.01)
(52) U.S. Cl.
CPC .... *G06V 30/1916* (2022.01); *G06V 30/19093* (2022.01)
(58) Field of Classification Search
None
See application file for complete search history.

(56) References Cited

U.S. PATENT DOCUMENTS

| 10,235,762 | B1* | 3/2019 | Wylie | G06V 20/52 |
| 2012/0308127 | A1* | 12/2012 | Kudoh | G06V 30/2455 382/165 |
| 2015/0169971 | A1* | 6/2015 | Cummins | G06F 40/00 382/182 |
| 2024/0020998 | A1* | 1/2024 | Lee | G06V 30/1473 |

FOREIGN PATENT DOCUMENTS

TW   201939354 A   10/2019

OTHER PUBLICATIONS

Chinese language office action dated Feb. 14, 2023, issued in application No. TW 111126250.

* cited by examiner

*Primary Examiner* — Edward Park
(74) *Attorney, Agent, or Firm* — McClure, Qualey & Rodack, LLP

(57) ABSTRACT

A character recognition method includes the stages as detailed in the following paragraph. An image is received, wherein the image is one in a plurality of consecutive images. A target object in the image is detected. Object information of the target object is defined according to the area ratio of the target object occupied in the image. Whether the target object in the image is the same as the target object in the previous image is determined according to the object information. Character recognition on the target object is performed to obtain a recognition result. The weighting score of the recognition result is calculated according to the object information and the recognition result. The weighting score of the recognition result of the target object in the consecutive images is accumulated until the weighting score is higher than a preset value, and the recognition result is output.

10 Claims, 8 Drawing Sheets

S110

CHARACTER RECOGNITION METHOD FOR DYNAMIC IMAGES

CROSS REFERENCE TO RELATED APPLICATIONS

This application claims the benefit of Taiwan Application No. 111126250, filed on Jul. 13, 2022, the entirety of which is incorporated by reference herein.

BACKGROUND OF THE INVENTION

Field of the Invention

The present invention relates to a character recognition method, and, in particular, to a character recognition method applied to consecutive and dynamic images.

Description of the Related Art

At present, most of the image character recognition on the market is mostly static image-character capture and recognition, the target object must stop in a position that is suitable for recognition. After that, the system takes one or two images and identifies the target object based on these images. Due to problems with cost and recognition accuracy in static image-character capture and recognition, dynamic image-character capture and recognition is continuously applied. The dynamic image-character capture and recognition does not require additional sensing equipment, and dynamic photography may continue to shoot, for example, 10 images per second. Therefore, a lot of images may be shot of each target object, and character capture and recognition can be performed on each image. As long as the recognition of several images is successful, the recognition success rate is greatly increased.

However, the dynamic image-character capture and recognition may consume a lot of system resources, affecting the performance of the system. If the target object moves too fast, the captured image may be blurry, which may affect the recognition result. Generally, the camera is not placed directly in front of the target object, so if the target object is too far or too close to the camera, the recognition accuracy will be affected. On the other hand, how to determine which recognition result is correct from the plurality of recognition results becomes an important issue.

BRIEF SUMMARY OF THE INVENTION

An embodiment of the present invention provides a character recognition method for dynamic images. The character recognition method includes the stages as detailed in the following paragraph. An image in a plurality of consecutive images is received. A target object in the image is detected. Object information of the target object is defined according to the area ratio of the target object occupied in the image. Whether the target object in the image is the same as the target object in the previous image is determined according to the object information, Character recognition on the target object is performed to obtain a recognition result. The weighting score of the recognition result is calculated according to the object information and the recognition result. The weighting score of the recognition result of the target object in the consecutive images is accumulated until the weighting score is higher than a preset value, and the recognition result is output.

According to the character recognition method described above, the character recognition method further includes the stages as detailed in the following paragraph. The object information of the target object is stored in the image to a cache. The recognition result of the target object in the image is stored in a candidate character list in the cache.

According to the character recognition method described above, the character recognition method further includes the stages as detailed in the following paragraph. The Character recognition on the target object is not performed when the recognition result of the target object in the image already exists in the candidate character list.

According to the character recognition method described above, the character recognition method further includes the stages as detailed in the following paragraph. An original character of the target object in the image is removed to form a blank area. The recognition result of the target object is copied to the blank area. The recognition result of the target object is compared with the original character of the target object to obtain a similarity result. It is determined that the recognition result is qualified when the similarity result is higher than a preset value.

According to the character recognition method described above, the character recognition method further includes the stages as detailed in the following paragraph. It is determined whether the recognition result conforms to a specific format. When the recognition result conforms to the specific format, the step of calculating the weighting score of the recognition result is performed.

According to the character recognition method described above, the object information of the target object includes the length, width, and coordinates of the target object in the image. The coordinates include a horizontal coordinate and a vertical coordinate.

According to the character recognition method described above, the step of defining the object information of the target object according to the area ratio of the target object occupied in the image includes the stages as detailed in the following paragraph. The distance of the target object is determined according to the size of the target object in the image. It is determined that the distance of the target object is moderate when the area ratio of the target object occupied in the image is between a first threshold ratio and a second threshold ratio. The extent of the target object in the image is enlarged according to a ratio. The object information of the target object is determined.

According to the character recognition method described above, the first threshold ratio is 0.5%, and the second threshold ratio is 3%.

According to the character recognition method described above, the step of determining whether the target object in the image is the same as the target object in the previous image according to the object information includes the stages as detailed in the following paragraph. It is determined that the target object in the image is the same as the target object in the previous image when the horizontal coordinate of the target object is located in a horizontal threshold interval, and the vertical coordinate of the target object is located in a vertical threshold interval. The horizontal threshold interval and the vertical threshold interval are associated with the coordinates of the target object in the previous image.

According to the character recognition method described above, the step of calculating the weighting score of the recognition result according to the object information and the recognition result includes the stages as detailed in the following paragraph. The product of the length of the target object and the width of the target object is divided by a predetermined constant to obtain the weighting score of the recognition result.

BRIEF DESCRIPTION OF THE DRAWINGS

The present invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the present invention.

DETAILED DESCRIPTION OF THE INVENTION

Certain words are used to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means. The following descriptions are preferred ways to implement the present invention. The purpose is to illustrate the spirit of the present invention and not to limit the scope of protection of the present invention.

The following description s the best embodiment expected of the present invention. These descriptions are used to illustrate the general principles of the present invention and should not be used to limit the present invention. The protection scope of the present invention should be determined on the basis of referring to the scope of the claims of the present invention.

Figure 1:
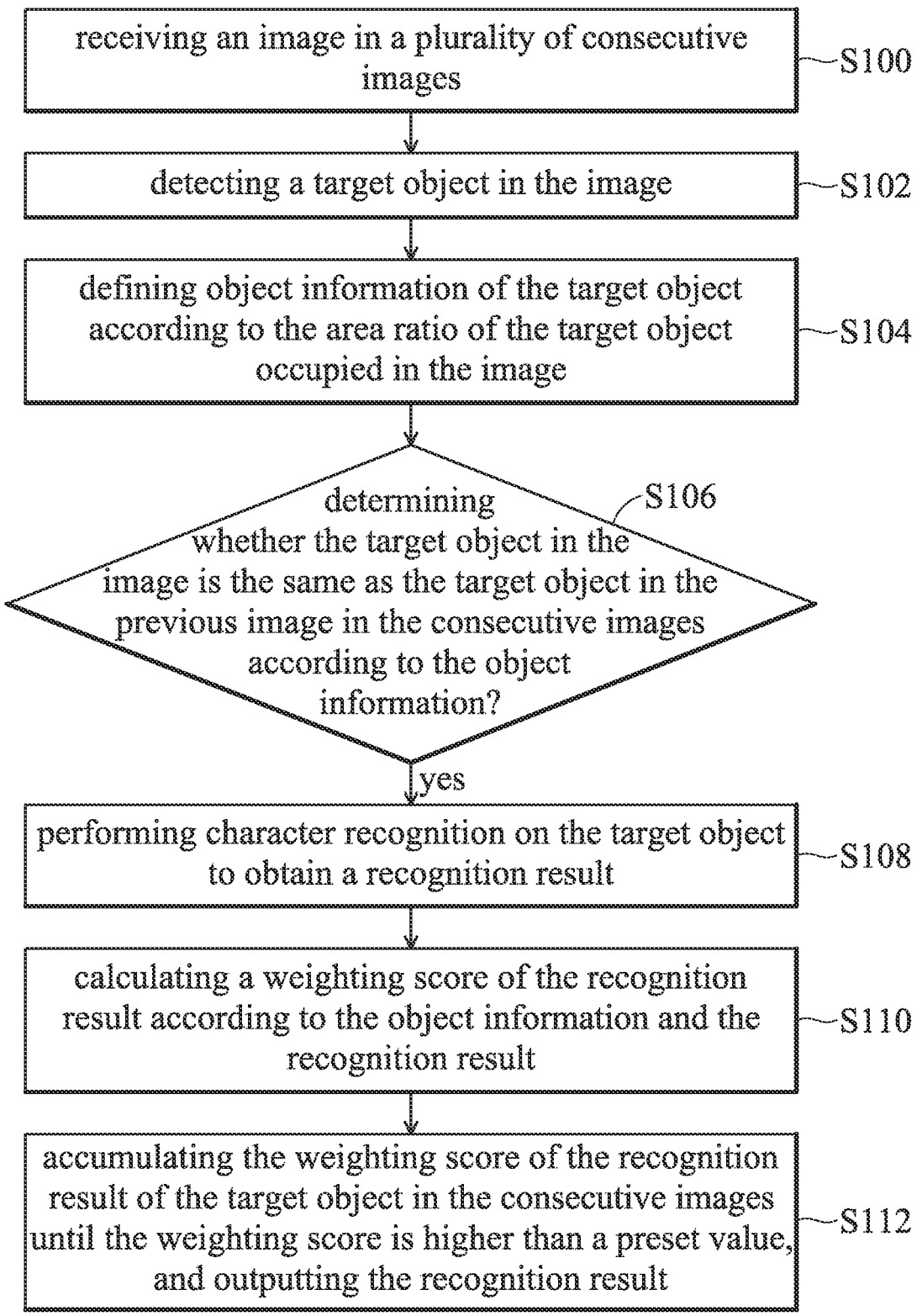
FIG. 1 is a flow chart of a character recognition method for dynamic images in accordance with some embodiments of the present invention.

FIG. 1 is a flow chart of a character recognition method for dynamic images in accordance with some embodiments of the present invention. As shown in FIG. 1, the character recognition method tier dynamic images of the present invention includes the stages as detailed in the following paragraph. An image in a plurality of consecutive images is received (step S100). A target object in the image is detected (step S102). Object information of the target object is defined according to the area ratio of the target object occupied in the image (step S104). It is determined whether the target object in the image is the same as the target object in the previous image according to the object information (step S106). Character recognition on the target object is performed to obtain a recognition result (step S108). The weighting score of the recognition result is calculated according to the object information and the recognition result (step S110), The weighting score of the recognition result of the target object in the consecutive images is accumulated until the weighting score is higher than a preset value, and outputting the recognition result (step S112).

In some embodiments, the consecutive images in step S100 are captured by a camera. For example, the camera can continuously capture 30 images per second, but the present invention is not limited thereto. In some embodiments, in step S102, the present invention uses an image recognition algorithm to recognize the target object in the image. The image recognition algorithm can be, for example, a convolutional neural network, but the present invention is not limited thereto. In some embodiments, the target object can be a license plate, but the present invention is not limited thereto. If the present invention does not detect the target object in step S102, the subsequent steps are not performed. In some embodiments, in step S102, if the present invention detects a target object, the initial object information of the target object can be obtained.

In some embodiments, the initial object information of the target object in step S102 and the object information of the target object in step S104 may be, for example, the length, width, and coordinates of the target object in the image. The coordinates comprise a horizontal coordinate and a vertical coordinate. In some embodiments, the length of the target object in the image can be, for example, the number of horizontal pixels occupied by the target object in the image. The width of the target object in the image can be, for example, the number of vertical pixels occupied by the target object n the image, but the sent is not limited thereto.

Figure 2:
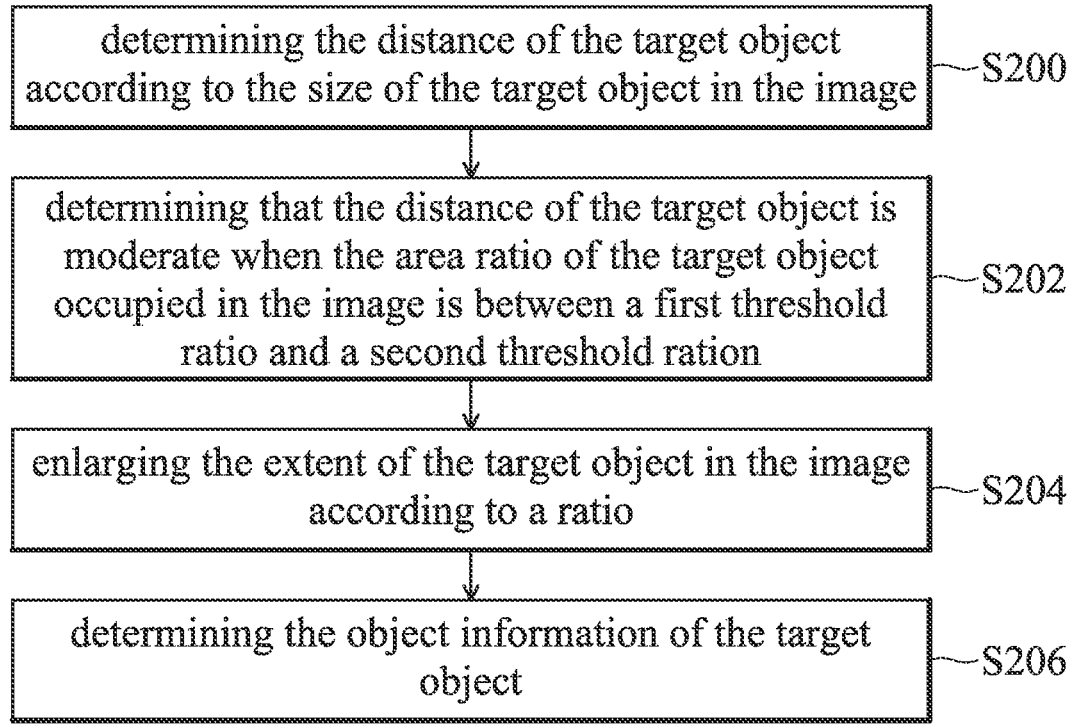
FIG. 2 is a detailed flow chart of step S104 in FIG. 1 in accordance with some embodiments of the present invention.

In some embodiments, the coordinates of the target object in the image can the coordinates of any pixel in the target object. For example, if the target object is a license plate, the coordinates of the target object can be defined as the pixel coordinates of the upper left corner of the license plate, but the present invention is not limited thereto. In some embodiments, in step S106, when the present invention determines that the target object in the image is the same as the target object in the previous image, the present invention may continue to perform step S108. FIG. 2 is a detailed flow chart of step S104 in FIG. 1 in accordance with some embodiments of the present invention. As shown in FIG. 2, step S104 in FIG. 1 of the present invention includes the stages as detailed in the following paragraph. The distance of the target object is determined according to the size of the target object in the image (step S200). It is determined that the distance of the target object is moderate when the area ratio of the target object occupied in the image is between a first threshold ratio and a second threshold ratio (step S202). The extent of the target object is enlarged in the image according to the ratio (step S204). The object information of the target object is determined (step S206).

In step S200, when the target object is closer to the camera, the extent of the target object in the image will be larger. In contrast, when the target object is far from the camera, the extent of the target object in the image will be smaller. Then, in step S202, when the area ratio of the target object occupied in the image is between 0.5% and 3%, the present invention determines that the distance between the target object and the camera is moderate, and the subsequent steps can be performed. In contrast, if the area ratio of the target object occupied in the image is less than 0.5%, the present invention determines that the distance between the target object and the camera is too far, which will affect the recognition result. Therefore, the present invention will discard the image and not process it. If the area ratio of the target object occupied in the image is greater than 3%, the present invention determines that the distance between the target object and the camera is too close, and the present invention determines that the target object may be cut off. Therefor the present invention will discard the image and not process it.

In step S204, the present invention can enlarge the extent of the target object in the image according to the ratio. In some embodiments, if the area ratio of the target object occupied in the image is 3%, the surrounding frame of the target object may not be completely captured. Therefore, the present invention enlarges the extent of the target object according to the ratio, so as to increase the recognition ability. After that, in step S206, the present invention can redefine the length, the width, and coordinates of the target object for subsequent processing in step S106 in FIG. 1. In some embodiments, the steps in FIG. 2 are the distance normalization method of the present invention.

Figure 3:
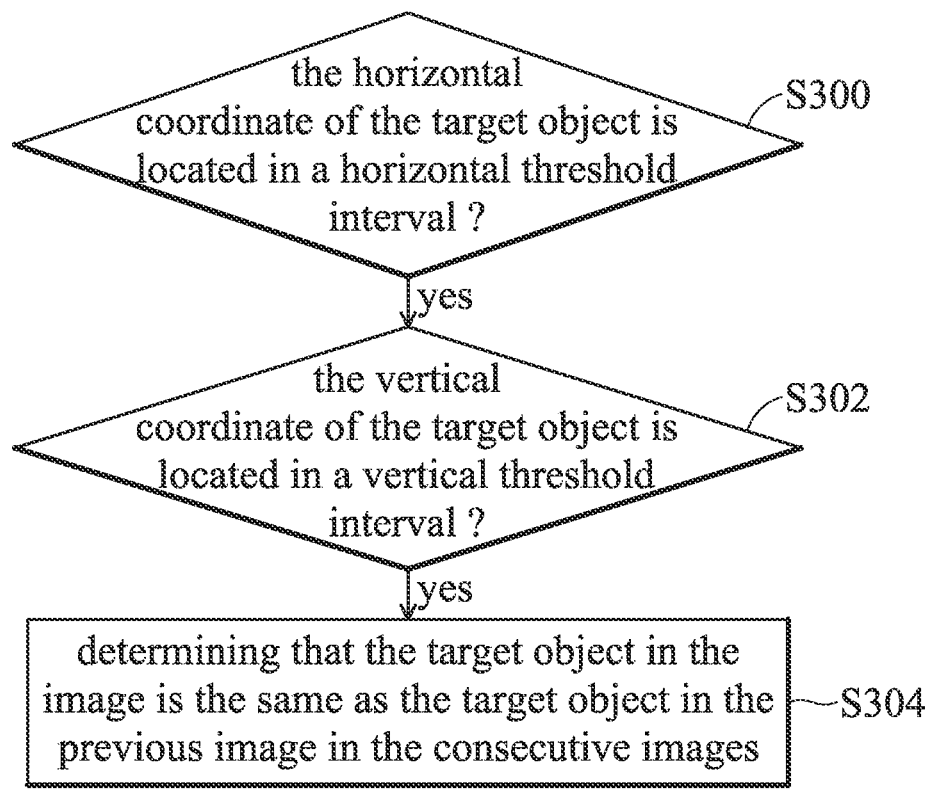
FIG. 3 is a detailed flow chart of step S106 in FIG. 1 in accordance with some embodiments of the present invention.

FIG. 3 is a detailed flow chart of step S106 in FIG. 1 in accordance with some embodiments of the present invention. As shown in FIG. 3, step S106 in FIG. 1 of the present invention includes the stages as detailed in the following paragraph. It is determined whether the horizontal coordinate of the target object is located in a horizontal threshold interval (step S300). It is determined that whether the vertical coordinate of the target object is located in a vertical threshold interval (step S302). It is determined that the target object in the image is the same as the target object in the previous image (step S304). In some embodiments, when the answer in step S300 is "yes", the present invention continues to perform the determination in step S302. In some embodiments, when the answer in step S302 is "yes", the present invention continues to pert m the action of step S304. In some embodiments, the present invention may read the object information of the target object in the previous image: from the cache, but the present invention is not limited thereto.

For example, it is assumed that the horizontal coordinate of the target object in the current image is $x_t$, the vertical coordinate of the target object in the current image is $y_t$, the horizontal coordinate of the target object in the previous image is $x_{t-1}$, and the vertical coordinate of the target object in the previous image is $y_{t-1}$. It is assumed that the horizontal width of the target object in the previous image is $w_{t-1}$, the vertical length of the target object in the previous image is $h_{t-1}$, $w_{FT}$ is the moving allowable rate of the target object in the horizontal direct, and $h_{FT}$ is the moving allowable rate of the target object in the vertical direction. When the horizontal coordinate xt and vertical coordinate t of the target object in the current image conform to the following equation 1, the present invention may perform step S304. In some embodiments, the steps in FIG. 3 are the method for determining the same object of the present invention.

$$x_{t-1}-w_{t-1}*w_{FT}<=x_t<=x_{t-1}+w_{t-1}*w_{FT}$$

$$y_{t-1}-h_{t-1}*h_{FT}<=y_t<=y_{t-1}+h_{t-1}*h_{FT} \qquad \text{equation 1}$$

Figure 4:
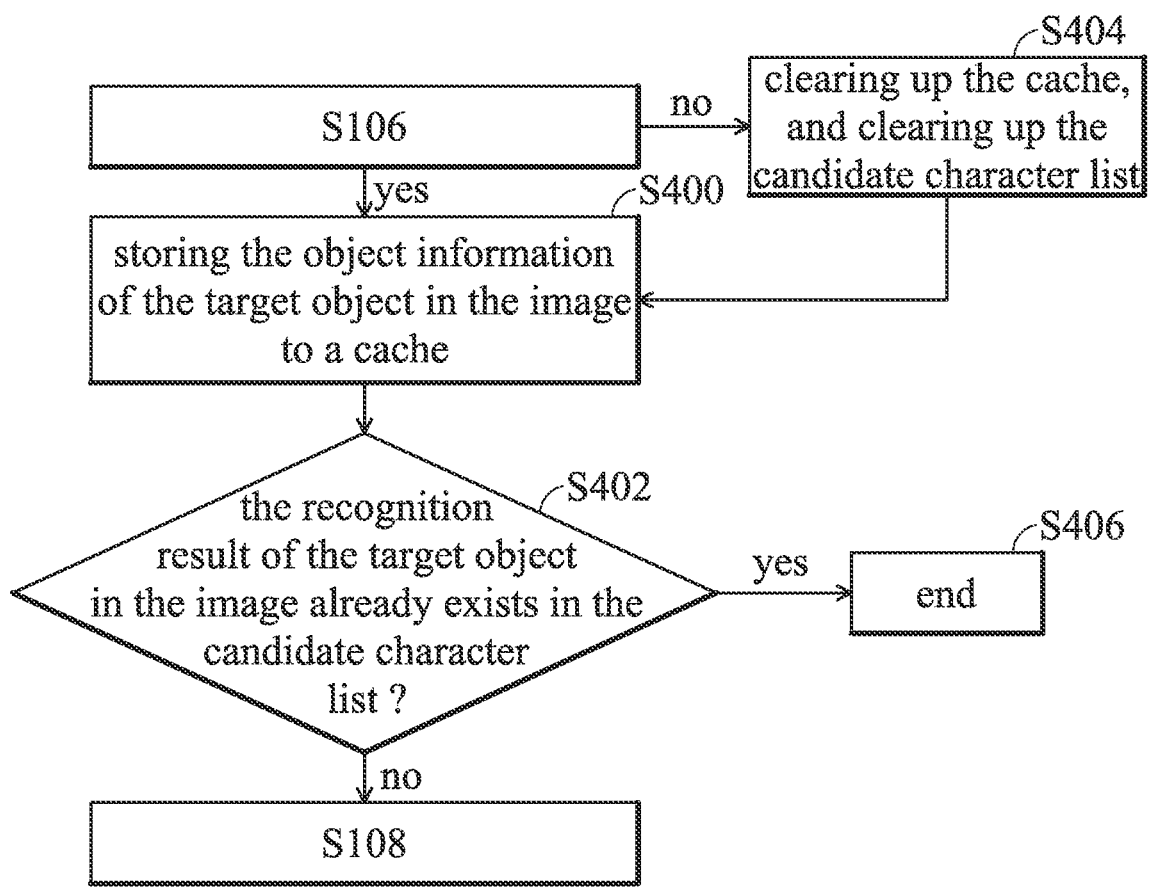
FIG. 4 is a flow chart of the character recognition method for dynamic images in FIG. 1 in accordance with another embodiment of the present invention.

FIG. 4 is a flow chart of the character recognition method for dynamic images in FIG. 1 in accordance with another embodiment of the present invention. FIG. 4 clearly illustrates other additional steps between steps S106 and S108 in FIG. 1. As shown in FIG. 4, when the present invention determines that the target object in the image is the same as the target object in the previous image: That is, the answer in step S106 in FIG. 1 is "yes", the character recognition method for dynamic images includes the stages as detailed in the following paragraph. The object information of the target object in the image is stored to a cache (step S400). It is determined whether the recognition result of the target object in the image already exists in a candidate character list (step S402). Since the present invention has already confirmed that the target object in the image is the same as the target object in the previous image, and the target object in the previous image has already completed the character recognition during the method of the previous round, the present invention can obtain the recognition result of the target object in the image before step S402 is performed.

In some embodiments, when the recognition result of the target object in the image has existed in the candidate character list: That is, the answer of step S402 in FIG. 4 is "yes", the present invention ends up the character recognition process (step S406), and does not perform character recognition on the target object. To put it simply, when the answer of step S402 is "yes", the present invention can increase the execution speed of the character recognition method. In contrast, when the recognition result of the target object in the image does not exist in the candidate character list: That is, the answer of step S402 in FIG. 4 is "no", the present invention continues to perform step S108 in FIG. 1 to perform character recognition on the target object in the image.

In some embodiments, when the present invention determines that the target object in the image is different from the target object in the previous image in the consecutive images: That is, the answer of step S106 in FIG. 1 is "no", the character recognition method for dynamic images of the present invention clears up the cache and clears up the candidate character list (step S404), and continues to perform the action of step S400 to store the object information of the target object in the image in the cache. At this time, since the present invention has not obtained the recognition result of the target object in the image, the present invention directly performs step S108 in FIG. 1. In some embodiments, the steps in FIG. 4 are the method of the present invention to speed up the processing.

Figure 5:
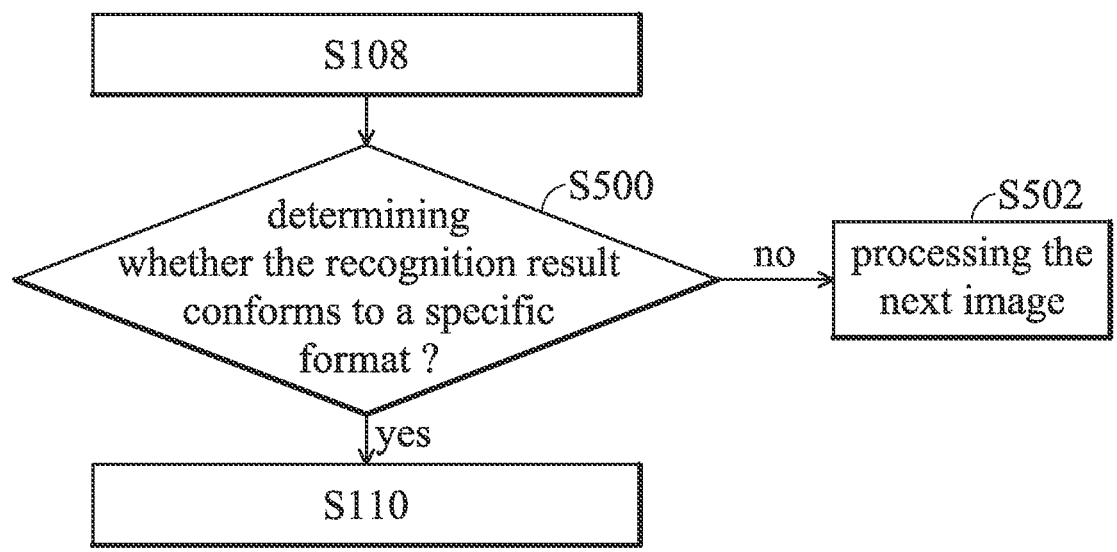
FIG. 5 is a flow chart of the character recognition method for dynamic images in FIG. 1 in accordance with another embodiment of the present invention.

FIG. 5 is a flow chart of the character recognition method for dynamic images in FIG. 1 in accordance with another embodiment of the present invention. FIG. 5 clearly illustrates other additional steps between step S108 and step S110 in FIG. 1. As shown in FIG. 5, after the present invention completes the character recognition on the target object in the image and obtains the recognition result, the character recognition method of the present invention further includes determining whether the recognition result conforms to a specific format (step S500). Generally, each country has its own format of the license plate. For example, the format of the license plate of the latest general self-use car in Taiwan is ABC-1234. That is, the first three codes are uppercase English letters, and the last four codes are numbers.

When the present invention determines that the recognition result of the target object in the image conforms to the specific format: That is, the answer of step S500 in FIG. 5 is "yes", the present invention performs step S110 in FIG. 1. In some embodiments, when the present invention determines that the recognition result of the target object in the image does not conform to the specific format: That is, the answer of step S500 in FIG. 5 is "no", the present invention performs step S502 to continue processing the next image in the consecutive images. In other words, the present invention does not perform subsequent processing on the recognition result of the target object in the current image.

Figure 6:
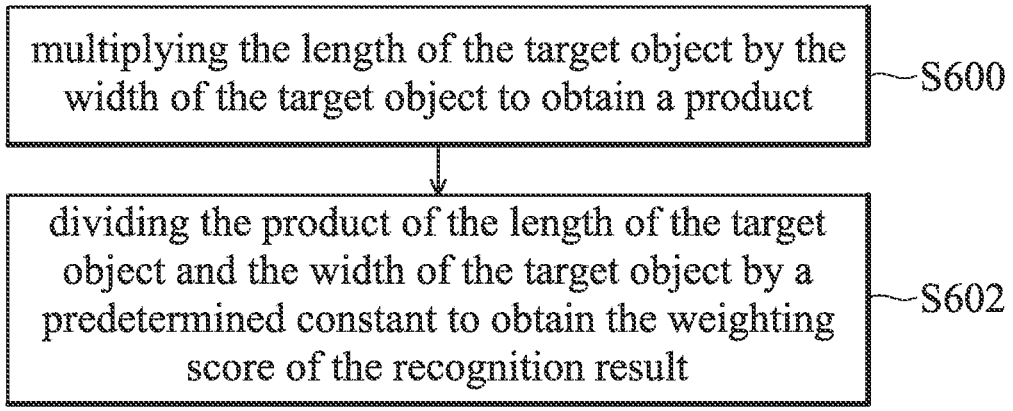
FIG. 6 is a detailed flow chart of step S110 in FIG. 1 in accordance with some embodiments of the present invention.

FIG. 6 is a detailed flow chart of step S110 in FIG. 1 in accordance with some embodiments of the present invention. As shown in FIG. 6, step S110 in FIG. 1 includes the stages as detailed in the following paragraph. The length of the target object is multiplied by the width of the target object to obtain a product (step S600). The product of the length of the target object and the width of the target object is divided by a predetermined constant to obtain the weighting score of the recognition result (step S602). In some embodiments, the predetermined constant in step S602 is 10000, but the present invention is not limited thereto.

In practical applications, if the area of the target object s larger 3% of that of the overall image, the recognition result of the target object will be relatively accurate. Therefore, the present invention sets the weighting score of the recognition result of the target object whose area is larger than 3% of the area of the whole image to 1. If the area of the target object is smaller than 3% of that of the overall image, the calculation of the weighting score will be based on the ratio between the area of the target object and the area of 3% of the area of the area of the overall image. In some embodiments, in the present invention, the recognition result and the weighting score of the target object in the image are stored in the cache, for example, in the candidate character list, which is used for subsequent accumulation.

In step S112 in FIG. 1, the present invention accumulates the weighting score of the recognition result of the target object in the consecutive images until the weighting score is higher than a preset value, and outputs the recognition result. Therefore, the driver can see the character recognized by the present invention on the screen, for example, the vehicle number. In some embodiments, the preset value is 3, but the present invention is not limited thereto. For example, the present invention determines that the recognition result of the target object in the first image of the consecutive images is the vehicle number 2217-YP, and calculates the weighting score of the vehicle number 2217-YP as 1. Therefore, the vehicle number 2217-YP will be stored in the candidate character list in the cache, and the weighting score of the vehicle number 2217-YP will also be stored in the cache. Next, the present invention determines that the recognition result of the target object in the second image of the consecutive images is the vehicle number 2217-YR, and calculates the weighting score of the vehicle number 2217-YR as 0.6. Therefore, the vehicle number 2217-YR will be stored in the candidate character list in the cache, and the weighting score of the vehicle number 2217-YR will also be stored in the cache.

Furthermore, the present invention determines that the recognition result of the target object in the third image of the consecutive images is the vehicle number 2217-YP, and calculates the weighting score of the vehicle number 2217-YP as 1. The present invention then accumulates the weighting score of the recognition result (e.g., the vehicle number 2217-YP) to 2 (1+1). After that, the present invention determines that the recognition result of the target object in the fourth image of the consecutive images is the vehicle number 2217-YP, and calculates the weighting score of the vehicle number 2217-YP as 0.9. The present invention then accumulates the weighting score of the recognition result (e.g., the vehicle number 2217-YP) to 2.9 (2+0.9). Then, the present invention determines that the recognition result of the target object in the fifth image of the consecutive images is the vehicle number 2217-YP, and calculates the weighting score of the vehicle number 2217-YP as 0.3. The present invention then accumulates the weighting score of the recognition result (e.g., the vehicle number 2217-YP) to 3.2 (2.9+0.3).

Since the weighting score of the recognition result of the target object (e.g., the vehicle number 2217-YP) is already higher than the preset value (for example, 3), the present invention outputs the vehicle number 2217-YP to the screen for the driver to view the recognition result from the present invention. In some embodiments, the present invention accumulates the weighting score of the recognition result of the target object in the consecutive images until the weighting score is higher than a preset value, but the present invention is not limited thereto. In some embodiments, the steps in FIG. 6 are the logic verification method of the present invention.

Figure 7:
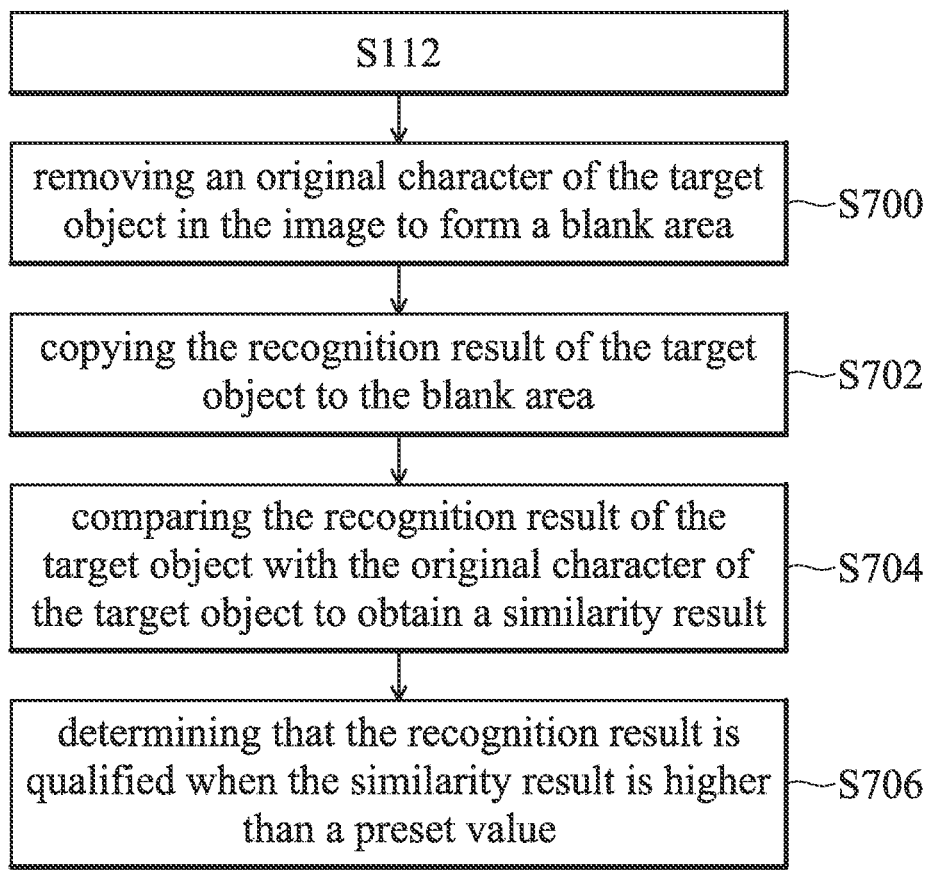
FIG. 7 is a flow chart of the character recognition method for dynamic images in FIG. 1 in accordance with another embodiment of the present invention.

FIG. 7 is a flow chart of the character recognition method for dynamic images in FIG. 1 in accordance with another embodiment of the present invention. FIG. 7 clearly illustrates the subsequent steps after completing step S112 in FIG. 1. As shown in FIG. 7, the character recognition method of the present invention includes the stages as detailed in the following paragraph. An original character of the target object in the image is removed to form a blank area (step S700), The recognition result of the target object is copied to the blank area (step S702). The recognition result of the target object is compared with the original character of the target object to obtain a similarity result (step S704). It is determined that the recognition result is qualified when the similarity result is higher than a preset value (step S706).

For example, the present invention determines that the recognition result of the target object is the vehicle number 2217-YP. After that, the present invention removes the picture of the vehicle number displayed in the image received by the camera to form a blank area. Then, the present invention copies the recognition result of the target object (e.g., the vehicle number 2217-YP) into the blank area in the image. Furthermore, the present invention compares the similarity between the image after the recognition result is copied to the blank area and the image received from the camera. In some embodiments, when the similarity between the image after the recognition result is copied to the blank area and the image received from the camera is higher than the preset value (for example, 95%), the present invention determines that the recognition result of the target object (that is, the vehicle number 2217-YP) is qualified. In some embodiments, the steps in FIG. 7 are the restoration verification method of the present invention.

Figure 8:
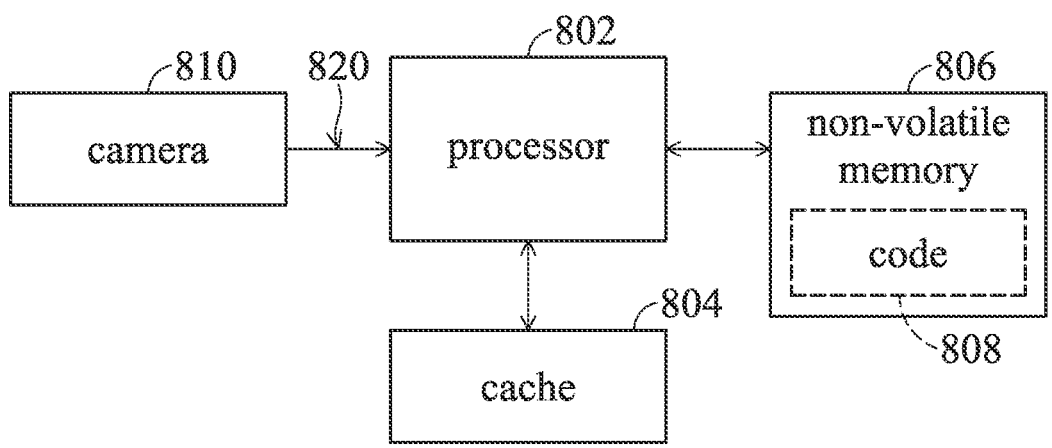
FIG. 8 is a schematic diagram of an electronic system 800 in accordance with another embodiment of the present invention.

FIG. 8 is a schematic diagram of an electronic system 800 in accordance with another embodiment of the present invention. As shown in FIG. 8, the electronic system 800 includes a processor 802, a cache 804, a non-volatile memory 806, and a camera 810. In some embodiments, the non-volatile memory 806 stores a code 808. In some embodiments, the processor 802 receives consecutive images 820 from the camera 810. In some embodiments, the processor 802 reads the code 808 in the non-volatile memory 806 to perform steps S100 to S102 in FIG. 1, steps S200 to S206 in FIG. 2, steps S300 to S304 in FIG. 3, steps S400 to S406 in FIG. 4, steps S500 and S502 in FIG. 5, steps S600 and S602 in FIG. 6, and steps S700 to S706 in FIG. 7.

In some embodiments, the processor 802 stores the object information of the target object, the recognition result of the target object, and the (accumulated) weighting score of the recognition result into the cache 804. In some embodiments, after the processor 802 is turned on, the non-volatile memory 806 reads a preset value for determining whether to output the recognition result, a preset value for determining whether the recognition result is qualified, a threshold ratio for determining whether the distance is moderate, a specific format of the recognition result and a predetermined constant for calculating the weighting score, etc. The processor 802 stores the above-mentioned parameters in the cache 804 for use when the code 808 is performed.

In the several embodiments provided by the present invention, it should be understood that the disclosed system, device, and method can be implemented using other methods. The device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicative connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of a software functional unit.

Although the present invention is disclosed above in the preferred embodiment, it is not intended to limit the scope of the present invention. Anyone with ordinary knowledge in the relevant technical field can make changes and modifications without departing from the spirit and scope of the present invention. Therefore, the protection scope of the present invention shall be determined by the scope of the claims.

What is claimed is:

1. A character recognition method for dynamic images, comprising:
    receiving an image in a plurality of consecutive images;
    detecting a target object in the image;
    defining object information of the target object according to the area ratio of the target object occupied in the image;
    determining whether the target object in the image is the same as the target object in the previous image in the consecutive images according to the object information;
    performing character recognition on the target object to obtain a recognition result;
    calculating a weighting score of the recognition result according to the object information and the recognition result; and
    accumulating the weighting score of the recognition result of the target object in the consecutive images until the weighting score is higher than a preset value, and outputting the recognition result.

2. The character recognition method as claimed in claim 1, further comprising:
    storing the object information of the target object in the image to a cache; and
    storing the recognition result of the target object in the image in a candidate character list in the cache.

3. The character recognition method as claimed in claim 2, further comprising:
    not performing the character recognition on the target object when the recognition result of the target object in the image already exists in the candidate character list.

4. The character recognition method as claimed in claim 1, further comprising:
    removing an original character of the target object in the image to form a blank area;
    copying the recognition result of the target object to the blank area;
    comparing the recognition result of the target object with the original character of the target object to obtain a similarity result; and
    determining that the recognition result is qualified when the similarity result is higher than a preset value.

5. The character recognition method as claimed in claim 1, further comprising:
    determining whether the recognition result conforms to a specific format;
    wherein when the recognition result conforms to the specific format, the step of calculating the weighting score of the recognition result is performed.

6. The character recognition method as claimed in claim 1, wherein the object information of the target object comprises length, width, and coordinates of the target object in the image; the coordinates comprise a horizontal coordinate and a vertical coordinate.

7. The character recognition method as claimed in claim 6, wherein the step of determining whether the target object in the image is the same as the target object in the previous image in the consecutive images according to the object information comprises:
    determining that the target object in the image is the same as the target object in the previous image in the consecutive images when the horizontal coordinate of the target object is located in a horizontal threshold interval, and the vertical coordinate of the target object is located in a vertical threshold interval;
    wherein the horizontal threshold interval and the vertical threshold interval are associated with the coordinates of the target object in the previous image.

8. The character recognition method as claimed in claim 6, wherein the step of calculating the weighting score of the recognition result according to the object information and the recognition result comprises:

dividing the product of the length of the target object and the width of the target object by a predetermined constant to obtain the weighting score of the recognition result.

9. The character recognition method as claimed in claim 1, wherein the step of defining the object information of the target object according to the area ratio of the target object occupied in the image comprises:

determining the distance of the target object according to the size of the target object in the image;

determining that the distance of the target object is moderate when the area ratio of the target object occupied in the image is between a first threshold ratio and a second threshold ratio;

enlarging the extent of the target object in the image according to a ratio; and determining the object information of the target object.

10. The character recognition method as claimed in claim 9, wherein the first threshold ratio is 0.5%, and the second threshold ratio is 3%.

\* \* \* \* \*